United States Patent Office 3,051,619
Patented Aug. 28, 1962

3,051,619
4-HYDROXY BUTYRIC ACID THERAPEUTIC COMPOSITIONS AND PROCESS OF USE FOR CLINICAL SEDATION, HYPNOSIS, OR ANAESTHESIA
Henri Marie Laborit, Paris, France, assignor to L'Equilibre Biologique, Commentry, France, a French body corporate
No Drawing. Filed May 9, 1961, Ser. No. 108,715
Claims priority, application France May 19, 1960
13 Claims. (Cl. 167—65)

The present invention relates, on one hand, to treatments making it possible to act on the nervous system of patients for the purpose of exercising in said patients a sedative, hypnotic or anaesthetic effect, and, on the other hand, to treatments aiming at reducing the catabolism of nitrogen.

Indeed, according to the present invention, a therapeutic composition has been found which has, on the one hand, a psychotropic, particularly a psycholeptic effect and which is capable especially to put patients into a sleep closely resembling ordinary sleep and, on the other hand, a favourable effect on the catabolism of nitrogen.

This composition is characterised in that it contains as active principle, in association with a therapeutically administrable vehicle, 4-hydroxybutyric acid or one of its therapeutically administrable salts.

By "4-hydroxy-butyric acid" as used herein are meant both the lacetone and the open chain forms of this acid, both these forms being in aqueous solution, according to the pH, in equilibrium according to

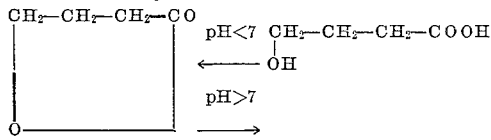

In the free state, in the absence of water, 4-hydroxybutyric acid exists in lactone form. In contrast, when in salt form, the acid is in open-chain acid-alcohol form. The 4-butyro-lactone, of mol. wet. 86.09 is an oily water-miscible liquid having a boiling point under a pressure of 760 mm. of mercury of about 206° C. It is soluble in methanol, ethanol, acetone, ether and benzene. The 4-butyro-lactone is prepared by catalytically dehydrating 1,4-butanediol according to Reppe (W.), Chemie Ingenieur Technik, 1950, 14–9, p. 365. Following purification, the 4-butyrolactone is used for the preparation of the salts of 4-hydroxy-butyric acid by reacting it with the corresponding bases.

Among the salts which are useable according to the present invention, are especially the alkali and alkaline-earth metal salts.

Thus, the sodium salt of 4-hydroxy-butyric acid, taken as an example of alkali metal salts, is produced by mixing with heating the 4-butyrolactone and the corresponding amount of dilute sodium hydroxide, followed by a crystallization or by a saturation of the lacetone with the aid of sodium bicarbonate. The product may be recrystallized from 95% alcohol for the purpose of improving the physical characteristics.

Sodium 4-hydroxy-butyrate $$HO-CH_2-CH_2-CH_2-COONa$$

of mol. wt. 126, is a microcrystalline hygroscopic powder which is highly soluble in water and which, in aqueous solution, has a pH slightly in excess of 7. This compound has a not very sharp melting point of 135–140° C.

The calcium salt of 4-hydroxybutyric acid, taken as an example of the alkaline-earth metal salts, is produced by reacting an aqueous solution of 4-butyrolacetone (1 mole) with lime OCa (0.5 mole). Following filtration, the clear solution is evaporated until the compound crystallizes.

Calcium 4-hydroxybutyrate

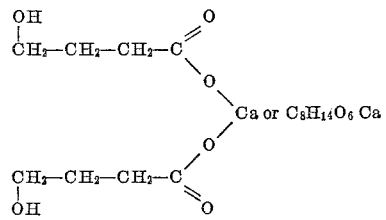

of mol. wt. 246.272 is a white water-soluble powder which, in 5% aqueous solution, has a pH of 7.1. This salt is poorly soluble in methanol, acetone, ether, benzene (about 0.5% solubility).

The pharmacological properties of the composition according to the present invention will be disclosed hereinafter with reference to sodium 4-hydroxy butyrate. This salt constitutes the preferred form of the active principle. However, its properties as a whole are also possessed by the other forms of the active principle listed hereinabove.

Toxicity tests were carried out in mice with sodium 4-hydroxy butyrate and gave the following results:

Intraperitoneally: LD50 is 1.94 g./kg. while
Orally: LD50 is 4.25 g./kc.

I.—Psycholeptic Effect

At a much smaller dosage, sodium 4-hydroxy-butyrate exercises an hypnogenic and sedative effect.

A sedative effect is obtained in mice with an efficient dose 50 of 21.5 mg./kg. on intraperitoneal administration. On oral administration, the efficient dose 50 is 81 mg./kg. for the same sedative effect as obtained above on intraperitoneal administration.

In addition, sodium 4-hydroxy-butyrate potentiates the effect of the various anaesthetic products, especially barbiturates.

In man, the intravenous administration of the product produces an electro-encephalographical tracing of sleep, after 20 minutes, with a depressed alpha rhythm and appearance of a slow rhythm: theta, then delta bursts, in more or less close succession.

This sleep tracing contains no fast rhythm. It is clear that the product distinctly promotes slow rhythms.

After one or two hours of deep sleep, it is quite easy to awaken the subject and to keep him awake. The tracing becomes then identical to the tracing obtained during the ordinary waking state.

The tracing is very physiological, reversible, with some tendency, toward re-synchronisation.

Moreover, the product has a partly inhibitory effect on convulsions caused by pentamethylenetetrazol and picrotoxine.

II.—Effect on Metabolism

The administration of sodium 4-hydroxybutyrate results in an improvement of the metabolism of nitrogen in patients in a state of nitrous catabolism: in patients having undergone surgery, for example, the urea and total nitrogen content in urine falls off to values which are much lower than the values prior to the administration, whereas there is no increase of the blood urea content.

It should be noted that the heat value of butyric acid on calorimetric bomb evaluation is 4.45 calories/gramme, which may therefore have a non-negligible effect from the standpoint of the calories contributed by lipids should one keep in mind the leading part played by the fatty radical in the energizing value of lipids, 4-hydroxy-butyric acid being the more simple of hydroxy-acids. Thus, the sedative effect is accompanied by a supply of calories and by a regulation of the metabolism of nitrogen resulting in a saving in proteins.

If the last two effects are the only ones sought for, the administration of the product will be carried out fractionwise, with respect to time, so as not to be hindered by the hypnogenic effect.

What has been set forth above is also true for the other salts of 4-hydroxy-butyric acid, especially for the calcium salt; however, the LD50 of this salt is different and is of 450 mg./kg. upon intra-peritoneal administration in mice.

Taking into account the above data, the therapeutic uses of the new composition are the following:

Sedative, hypnotic and anaesthetic purposes at a daily dosage of 10 to 150 mg./kg.;

Potentiation of the conventional anaesthetics which may thus be used at reduced doses;

Saving in proteins, at the same dosage as above, but on fractionated administration of the product with respect to time.

For such uses, the active principle will be formulated according to the desired type of administration.

The preferred routes of administration are the parenteral or rectal routes, but oral administration is not excluded. Thus, the active principle will be advantageously made up in the form of injectable solutions, enemas or suppositories, the corresponding vehicles being aqueous solutions and pasty excipients.

In addition, the composition may contain anaesthetic compound whose activity will be potentiated by the 4-hydroxy-butyric acid or the derivative thereof which is used.

The invention may be further described by reference to the following non-limitative examples of useful formulations:

Example 1.—Injectable Ampoule

|  | g. |
|---|---|
| Sodium 4-hydroxy-butyrate | 1,2115 |
| Water to make 10 ml. | |

This composition is made up by shaking up the requisite amount of 4-butyrolactone in an aqueous sodium hydroxide solution.

This composition was administered at a dosage of 3 ampoules to a man of 70 kg. weight, and allowed for a surgical operation lasting 1 hour and 45 minutes, arterial pressure staying at 13 and the heart beating steadily at 70 beats per minute.

In its anaesthetic uses, however, it may be preferable to administer the composition dropwise. There is hence a need for a formulation containing a sugar (glucose, levulose or sorbitol) or sodium chloride. Examples 2 and 3 below are examples of suitable formulations for this purpose.

Example 2

|  | g. |
|---|---|
| Sodium 4-hydroxy-butyrate | 0.10 to 2 |
| Sugar (glucose, levulose or sorbitol) | 1 to 15 |
| Water to make 100 ml. | |

Example 3

|  | g. |
|---|---|
| Sodium 4-hydroxy-butyrate | 0.10 to 2 |
| Sodium chloride | 2.25 to 1.5 |
| Water to make 100 ml. | |

Example 4

Calcium 4-hydroxy-butyrate is less hygroscopical than the corresponding sodium salt and is readily used in suppository formulations. A suitable formulation for a suppository is, for example, the following:

|  | g. |
|---|---|
| Calcium 4-hydroxy-butyrate | 1 |
| Excipient | 2 |

The following example is given for the purpose of illustrating the clinical application of a formulation according to Example 2.

Clinical Example

This example relates to a surgical operation which lasted 1 hour and 50 minutes for a bilateral luxation of the petalla in a 25 year old man.

One hour prior to the operation, the following premedication was administered:

|  | mg. |
|---|---|
| Péthidine | 100 |
| Promethazine | 50 |

Upon entering the operating room, arterial pressure is 15/5, pulse beats at 118. Profusion is started with 250 ml. of serum containing 15% glucose to which has been added 3.63 g. of sodium 4-hydroxy-butyrate. The rate of perfusion is fast: 100 ml. over 10 minutes.

The patient falls into a deep sleep, with muscle resolution. The pupils are myotic, but corneal reflexes are maintained.

The pulse rythm decreases from 118 to 72; blood pressure is unchanged.

When the perfusion is over, the operative field is prepared and when the clamps are placed, there is observed a slight reaction at the level of the facial muscles.

15 cg. of penthiobarbital is injected during the operation; this dose, if used alone, would not have been sufficient for anaesthetizing the patient.

At the end of the operation, the patient moves while the wound is sutured with gut and has recovered his palpebral reflexes.

There occurred no depression of ventilation which, therefore, required no assistance.

Pulse varied from 64 to 80, and maximum blood pressure between 13 and 15.

Having now described my invention what I claim as new and desire to secure by Letters Patent is:

1. Therapeutic composition having a sedative, hypnotic and anaesthetic effect and having an action on the metabolism of nitrogen, containing, as active principle, in association with a pharmaceutically administrable vehicle, a compound selected from the group consisting of 4-hydroxy-butyric acid and the therapeutically administrable salts thereof.

2. Therapeutic composition having a sedative, hypnotic and anaesthetic effect and having an action on the metabolism of nitrogen, containing, as active principle, in association with a therapeutically administrable vehicle, an alkali metal salt of 4-hydroxy-butyric acid.

3. Therapeutic composition as claimed in claim 2, wherein said alkali metal salt is the sodium salt.

4. Therapeutic composition having a sedative, hypnotic and anaesthetic effect and having an action on the metabolism of nitrogen, containing, as active principle, in association with a pharmaceutically administrable vehicle, an alkaline-earth metal salt of 4-hydroxy-butyric acid.

5. Composition as claimed in claim 4, wherein said alkaline-earth metal salt is calcium salt.

6. Composition as claimed in claim 5, wherein said calcium salt is formulated in the form of suppositories.

7. Injectable composition having a sedative, hypnotic and anaesthetic effect and having an action on the metabolism of nitrogen, comprising a sterile aqueous solution of a compound selected from the group consisting of 4-hydroxy-butyric acid and the therapeutically administrable salts thereof.

8. Composition as claimed in claim 7 adapted for dropwise administration by perfusion wherein said aqueous solution further contains sodium chloride.

9. Composition as claimed in claim 7 adapted for dropwise administration by perfusion, wherein said aqueous solution further contains a carbohydrate.

10. Process for exercising in patients a sedative, hypnotic and anaesthetic effect, comprising administering to said patients a compound selected from the group consisting of 4-hydroxy-butyric acid and the therapeutically administrable salts thereof.

11. Process as claimed in claim 10, wherein said compound is administered at a daily dosage of 10 to 150 mg./kg.

12. Process for controlling the metabolism of nitrogen and exercising an effect of protein saving in patients, comprising administering to said patients a compound selected from the group consisting of 4-hydroxy-butyric acid and the therapeutically administrable salts thereof.

13. Process as claimed in claim 11, wherein said compound is administered in fractional doses at a total daily dosage of 10 to 150 mg./kg.

References Cited in the file of this patent

UNITED STATES PATENTS

| | | |
|---|---|---|
| 2,957,805 | Van Wassem | Oct. 25, 1960 |
| 2,960,441 | Van Wassem et al. | Nov. 15, 1960 |

OTHER REFERENCES

Ohara et al.: "Free B-Hydroxy-γ-Amino-Butyric Acid in Brain," Science, 129 (3357), pages 1225–1226, May 1, 1959.

Roberts et al.: "Metabolic and Neurophysiological Roles of γ-Aminobutyric Acid," Int. Review of Neurobiology, vol. 2, pages 279–332 (1960).

Matthews et al.: "The Effect of Gamma-Aminobutyric Acid on Synaptic Transmission in Autonomic Ganglia," J. Pharmacol. and Exp. Therap., 132 (1), pages 19–22, April 1961.